United States Patent Office 3,461,916
Patented Aug. 19, 1969

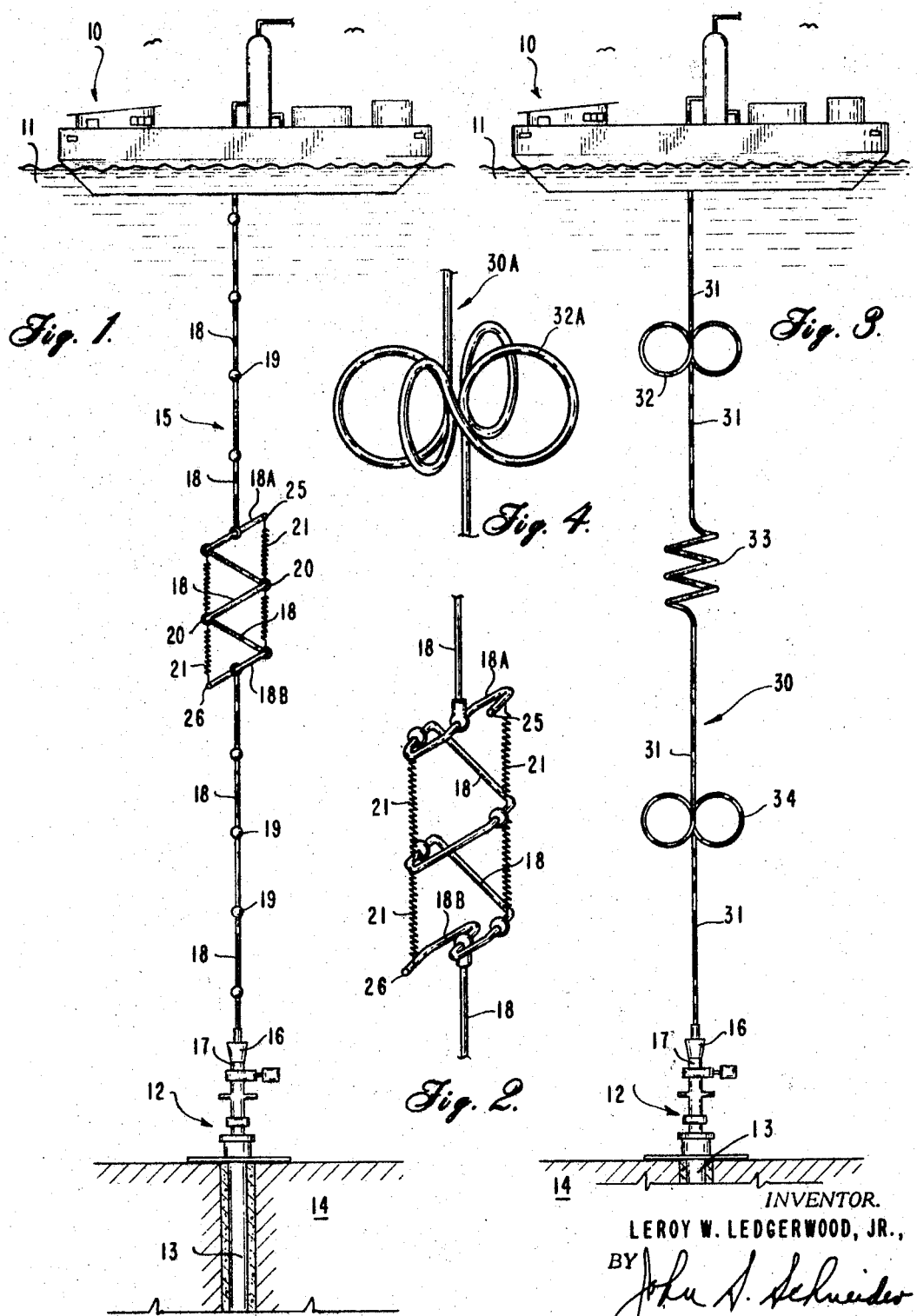

3,461,916
FLEXIBLE FLOWLINE
Leroy W. Ledgerwood, Jr., Houston, Tex., assignor to Esso Production Research Company
Filed Dec. 13, 1966, Ser. No. 601,469
Int. Cl. F16l *11/14;* B65b *3/00*
U.S. Cl. 138—120                    15 Claims

ABSTRACT OF THE DISCLOSURE

A flexible flowline connected between a floating vessel and a subsea well installation provided with means to permit lateral and vertical motion of the floating vessel.

---

The present invention generally concerns facilities for producing oil and gas from wells drilled into subsurface formations underlying water. More particularly, it concerns a flexible flowline for use between a moored floating vessel and a subsea well installation.

In conducting producing operations from a floating vessel, a conduit or flowline must be provided between the vessel and the subsea installation (a wellhead or a manifold on top of risers) that is sufficiently flexible to permit the upper end of the flowline to have large lateral and vertical motions, which result from movement of the vessel caused by wave and wind action, relative to its lower fixed end without developing undue stress in the flowline or wihout causing variations in the internal diameter of the flowline.

These flexiblle flowlines may be of two types. One type must function to withstand very large amplitudes of both vertical and lateral motions. It must remain in service continuously as a flowline to conduct production fluids from the well to the surface vessel. The other type flexible flowline is preferably used only when a well is being worked over. While this latter flowline must be capable of tolerating both vertical and horizontal motions, it also must maintain a constant internal diameter throughout its length and must be otherwise formed to permit the passage of through-tubing workover tools. The flowlines of the present invention meet all of these requirements.

Therefore, a primary object of the present invention is to provide new and improved flexible flowlines which extend between a floating vessel and a subsurface connection many feet, e.g., 50 to 200 feet, below the surface of the water, through which producing and workover operations may be carried out.

In accordance with the teachings of one embodiment of the present invention, a flowline adapted to extend between a floating vessel and a subsea installation includes a plurality of tubular members coupled together, at least one series of the tubular members being coupled together by ball joints to permit lateral movement of the flowline in response to movement of said vessel and at least another series of the tubular members being hinged together by swivel joints and arranged in a vertically extending zig-zag path with a tension spring connecting the ends of the two adjacent tubular membes forming each angle of said zig-zag path to permit the tubular members to fold and unfold in accordion-like fashion in response to vertical movement of said vessel.

In accordance with the teachings of another embodiment of the present invention, a flowline extending between a floating vessel and a subsea installation includes a series of tubular members coupled together, at least one portion of the flowline being formed in a circular loop and at least one other portion of the flowline being formed in a helix to permit lateral and vertical movement of said flowline in response to movements of said vessel. Alternatively, two circular loops, or double loops, may be formed in one vertical plane by said one portion of the flowline instead of a single circular loop. In a third case, pairs of loops may be placed in two vertical planes, with the planes preferably at right angels to each other.

The above object and other objects and advantages of the invention will be apparent from a more detailed description thereof when taken with the drawings wherein:

FIG. 1 is an overall diagrammatic view of one form of the invention in which the flowline is shown extending between a floating vessel and a wellhead;

FIG. 2 is an oblique view of a portion of the flowline shown in FIG. 1;

FIG. 3 is a view similar to that of FIG. 1 illustrating another form of flowline; and FIG. 4 is a diagrammatic illustration of another flowline configuration particularly useful in the flowline embodiment illustrated in FIG. 3.

Referring to the drawings in greater detail, in FIG. 1 is shown a production barge or vessel 10 floating on a body of water 11 and moored in position over a wellhead 12. A well 13 to which wellhead 12 is connected penetrates the land 14 underlying water 11 to a subsurface producing formation, not shown. A flexible flowline generally designated 15 is connected at its upper end to vessel 10 and at its lower end to a manifold 16 mounted on risers 17 attached to wellhead 12. Flowline 15 includes an upper series of rigid steel tubular members 18, e.g., four to six inches in diameter, coupled to each other by means of ball joints 19 and a lower series of such tubular members 18 so connected together by ball joints 19 and an intermediate series of tubular members 18 hinged together by means of swivel joints 20 and vertically extending in a zig-zag path with the ends of adjacent tubular members forming each angle of said zig-zag path connected together by tension springs 21, as also shown in FIG. 2. The ends 25 and 26 of the upper and lower tubular members 18*a* and 18*b*, respectively, are plugged. This midsection of the flowline is arranged in an accordion fashion using springs 21 having low spring constants so that flowline 15 can expand and contract as the tubular members unfold and fold in response to the rise and fall of vessel 10 caused by wave and wind action. Production from well 13 flows upwardly through tubular members 18 and ball joints 19 and swivel joints 20 to production vessel 10 during lateral and vertical deflections of flowline 15. Ball joint connections 19 allow lateral movement of flowline 15.

All of the components of flowline 15 are commercially available, including ball joints 19, which may be suitably a type such as manufactured by the Thornhill Craver Company, Houston, Tex., and swivel joints 20, which may be of the type disclosed on pages 1338 and 1339 of the "Composite Catalog of Oil Field Equipment and Services," volume I, 27th Revision, 1966–67.

In FIG. 3, a different form of flowline extending between vessel 10 and the manifold 16 is illustrated. This flowline, generally designated 30, includes a series of tubular members 31 connected together either by conventional welded or threaded connections. Along one portion of the length of flowline 30, these tubular members are formed as at 32 in double-circular loops and along another portion of the length of flowline 30 as at 33 in the form of a spiral or helix. An additional double-circular loop is formed in flowline 30 below helix 33 as indicated at 34. The tubing curvature should be sufficiently large to allow free movement of through-tubing tools during workover operations. Preferably, all bends in the flowline have a minimum radius of 10 feet to permit the passage of conventional through-tubing tools. Formation of flowline 30 in these configurations permits lateral and vertical movements of flowline 30 in response to movements of vessel 10 caused by wave and wind action. In addition, flowline 30 maintains at all times a constant internal diameter which permits the passage of through-tubing tools which it may be necessary to pump into and from well 13 during workover operations. During production operations, fluids flow from well 13 upwardly through loops 34, helix 33 and loops 32 to the vessel 10. During workover operations, tools would be carried through flowline 30 including the loops and helix. Also, in flowline 30 the loops to permit lateral motion can be arranged to lie in different vertical planes to compensate for lateral motions in different directions. For example, as illustrated in FIG. 4, the placing of four loops 32A at the same level in flowline 30A, two loops in one plane and two loops in a plane perpendicular to the first plane, would act as a universal joint and permit lateral motion in any direction.

The invention is not to be considered restrictive to the specific details set forth above as various modifications thereof may be made without departing from the spirit and scope of this invention. Variations in the arrangements of the two embodiments of the invention illustrated may be made. For example, more than one vertical motion compensator of the zig-zag arrangement could be employed in flowline 15 or this zig-zag arrangement of the tubular members could be added to flowline 30 or substituted for the helix arrangement 33 of flowline 30. In addition, in flowline 30, one or more vertically spaced-apart single loops could be substituted for or used together with one or more of the double loops 32 and 34, or one or more of the two double loops 32A of flowline 30A could be used with or substituted for the aforesaid single or double loop arrangements.

Having fully described the objects, advantages, apparatus and mode of operation of my invention, I claim:

1. Apparatus for use in offshore operations comprising a flexible flowline comprising a plurality of tubular members coupled together extending between a floating vessel and a subsea installation, said flowline including at least one series of tubular members hinged together by swivel joints in a vertically extending zig-zag path with a tension spring connecting the ends of the two adjacent tubular members forming each angle of said zig-zag path to permit said tubular members to fold and unfold in accordion-like fashion in response to vertical movement of said vessel.

2. Apparatus as recited in claim 1 in which said flexible flowline includes at least one other series of said tubular members being coupled together by ball joints to permit lateral movement of said flowline in response to movement of said vessel.

3. Apparatus as recited in claim 2 in which said series of tubular members hinged together by swivel joints is arranged between upper and lower series of said tubular members coupled together by ball joints.

4. Apparatus for use in offshore operations comprising a flexible flowline extending between a floating vessel and a subsea installation, said flowline including a series of tubular members coupled together, at least one portion of said flowline being formed in at least one circular loop.

5. Apparatus as recited in claim 4 in which said flowline also includes a portion thereof formed in a helix.

6. Apparatus as recited in claim 4 in which said one portion of said flowline is formed in double-circular loops.

7. Apparatus as recited in claim 6 in which said flowline includes another portion thereof formed in a helix.

8. Apparatus as recited in claim 6 in which said double-circular loops are formed in planes perpendicular to each other.

9. Apparatus as recited in claim 8 in which said flowline includes another portion thereof formed in a helix.

10. Apparatus for use in offshore operations comprising a flexible flowline extending between a floating vessel and a subsea installation, said flowline including at least one portion thereof formed in a helix.

11. Apparatus for use in offshore operations comprising:
a flexible, tubular flowline extending between a floating vessel and a subsea installation, said flowline being provided with circular loops to permit lateral and vertical movement of said flowline in response to movements of said vessel, said flowline having an internal diameter sufficient to permit the passage of through-tubing workover tools.

12. Apparatus as recited in claim 11 including at least one circular loop in a generally vertical plane formed in said flowline.

13. Apparatus as recited in claim 12 including at least one circular loop in a generally horizontal plane formed in said flowline.

14. Apparatus as recited in claim 11 including at least one circular loop in a generally horizontal plane formed in said flowline.

15. Apparatus for use in offshore operations comprising:
a flexible flowline including a plurality of tubular members coupled together extending between a floating vessel and a subsea installation, said flowline including at least one series of first tubular members hinged together by swivel joints in a vertically extending zig-zag path with a tension spring connecting the ends of the two adjacent first tubular members forming each angle of said zig-zag path to permit said first tubular members to fold and unfold in accordion-like fashion in response to vertical movement of said vessel, said flowline also including a series of second tubular members coupled together, at least one portion thereof being formed in at least one circular loop and at least one other portion thereof being formed in a helix.

References Cited
UNITED STATES PATENTS

| | | | |
|---|---|---|---|
| 2,648,201 | 8/1953 | Marancik et al. | 141—388 |
| 3,126,913 | 3/1964 | Green et al. | 137—615 |
| 3,154,118 | 10/1964 | Silveston | 141—388 |

FOREIGN PATENTS

| | | |
|---|---|---|
| 1,221,219 | 5/1960 | France. |

PATRICK D. LAWSON, Primary Examiner

U.S. Cl. X.R.

141—388